June 18, 1935. H. W. DAUDT ET AL 2,005,708
PRODUCTION OF HALOGENATED ETHANE DERIVATIVES CONTAINING FLOURINE
Filed Aug. 24, 1933  2 Sheets-Sheet 1

Fig. 1

INVENTORS
Herbert W. Daudt
BY Mortimer A. Youker
ATTORNEY.

Fig. 2

Patented June 18, 1935

2,005,708

UNITED STATES PATENT OFFICE 2,005,708

PRODUCTION OF HALOGENATED ETHANE DERIVATIVES CONTAINING FLUORINE

Herbert Wilkens Daudt and Mortimer Alexander Youker, Wilmington, Del., assignors to Kinetic Chemicals, Inc., Wilmington, Del., a corporation of Delaware Application August 24, 1933, Serial No. 686,618

29 Claims. (Cl. 260—162)

This invention relates to organic fluorine compounds, more particularly highly fluorinated acyclic hydrocarbon derivatives, and a process for the manufacture thereof.

This application is a continuation-in-part of our co-pending application Serial No. 483,289, filed September 20, 1930.

We have found that by passing hydrogen fluoride and a halogenated acyclic hydrocarbon containing a halogen atom other than fluorine into an antimony halide or a mixture of antimony halides such as, for example, a mixture of antimony trichloride and antimony pentachloride, fluorinated acyclic hydrocarbon derivatives may be obtained. When carbon tetrachloride is fluorinated in this manner at temperatures between about 45° C. and 95° C. under atmospheric pressure, the fluorinated products are largely monofluoro-trichloro methane and difluoro-dichloro methane. When a completely halogenated ethane such as, for example, hexachloro ethane, is fluorinated in accordance with this process under the same temperature and pressure conditions, the fluorinated products contain fluoro-pentachloro ethane, difluoro-tetrachloro ethane and moderate amounts of trifluorotrichloro ethane. The conditions described, however, are not generally practical for the production in commercial quantities of higher fluorinated acyclic hydrocarbons, such as, for example, trifluoro-chloro methane, tetrafluoro dichloro ethane and the like.

It is an object of the present invention to produce fluorinated acyclic hydrocarbon derivatives containing two carbon atoms. A further object is the provision of a commercial process for the production of fluorinated ethane derivatives by a reaction which proceeds smoothly and, if desired, may be operated continuously without undesirable side reactions. Another object is the provision of a new and improved process for the production of highly fluorinated ethanes, such as, for example, trifluoro-trichloro ethane and tetrafluoro-dichloro ethane. Other objects will appear hereinafter.

These objects are accomplished according to the present invention whereby fluorinated acyclic hydrocarbon derivatives containing two carbon atoms are produced by the fluorination of a halogenated acyclic hydrocarbon derivative containing two carbon atoms and a halogen other than fluorine in the presence of a fluorinating catalyst, such as an antimony halide, preferably at temperatures above 95° C. under super-atmospheric pressures.

In the drawings, the apparatus shown in Fig. 2 is a continuation of the apparatus shown in Fig. 1. The apparatus in each figure is shown partly in section and somewhat diagrammatic. The apparatus of both figures taken together illustrates only one form of apparatus for carrying out the process of the invention.

Figure 1:
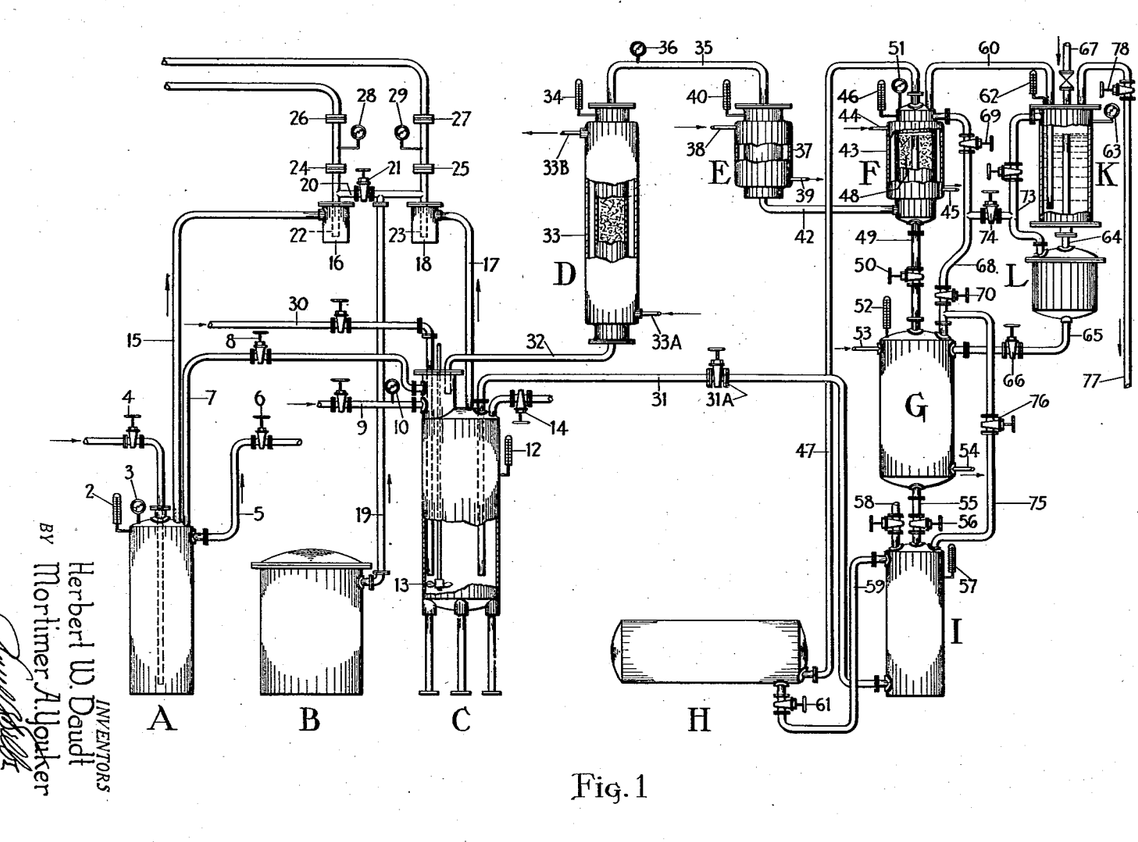

Referring to Fig. 1, the fluorination reaction is effected in a reactor, such as illustrated at C. This may be done conveniently by placing in reactor C an antimony halide catalyst, heating the catalyst to the desired reaction temperature, and then simultaneously or intermittently adding thereto a fluorinating agent, such as hydrogen fluoride, and an acyclic halogen derivative which is to be fluorinated. The hydrogen fluoride may be introduced as a liquid or as a gas. The antimony halide, under the conditions hereinafter described, is normally in liquid phase. The acyclic halogen derivative to be fluorinated may be introduced either as a gas or as a liquid. It may be added directly, as, for example, from a suitable storage vessel, but may be first employed as a scrubbing liquid for the vapors issuing from the reaction zone.

The gaseous fluorinated product, together with any other substances which may be present therein, such as hydrogen halides and unconverted acyclic halogen derivatives, is purified and the organic fluorine compounds recovered or returned to the process in any suitable manner. According to the general procedure illustrated in the drawings, the gases from the reaction zone pass from reactor C through a reflux column D into a trap E which is preferably maintained at a relatively high temperature. From trap E the gases pass into a heated scrubbing liquid contained in scrubber F. This scrubbing liquid preferably comprises substantially the compound to be fluorinated. It serves to remove volatized catalyst and also portions of the higher boiling compounds present in the gases, such as, for example, unconverted acyclic halogen derivatives and higher boiling fluorine derivatives. This scrubbing liquid is preferably returned to the reaction zone through a reservoir G, from which it passes into a weight tank I and thence to reactor C. Reservoir G and weigh tank I are preferably provided with agitating means (not shown).

The gases from the scrubber F pass into a vessel K which is maintained at a relatively low temperature in order to condense unconverted acyclic halogen derivatives and partially fluorinated compounds. Vessel K also functions as a scrubber. This condensate is then preferably allowed to overflow into a storage vessel L from which is is transferred to storage vessel G, where it becomes mixed with the scrubbing liquid from scrubber F and is introduced into reactor C through weigh tank I, as previously described. If desired, it may be added separately to reactor C through a weigh tank (not shown).

Figure 2:
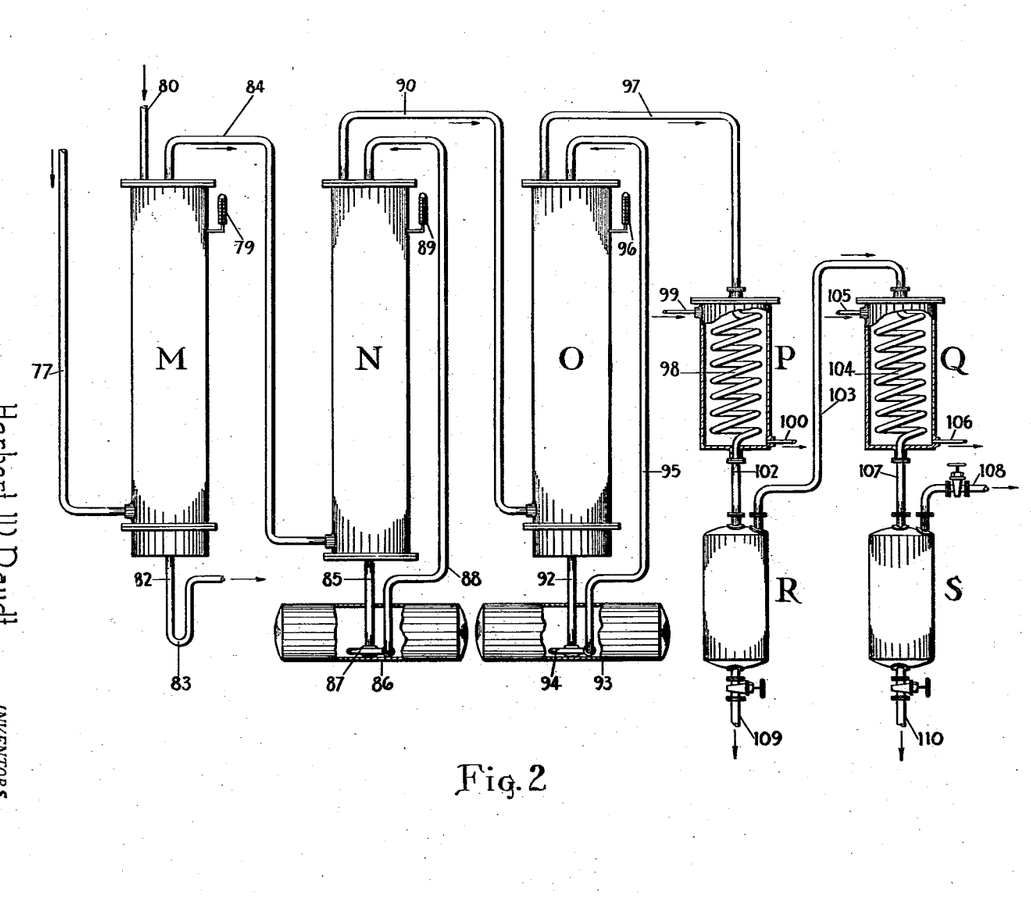

Referring to Fig. 2, the gases from the vessel K (Fig. 1) are further purified by passing them through a water scrubber M and then through an alkaline hydroxide scrubbing solution circulated in scrubber N. Scrubbers M and N are chiefly useful in removing hydrogen halides from the fluorinated products. Other suitable scrubbing agents or materials capable of removing hydrogen halides, such as, for example, milk of lime or the like, may be used for this purpose.

Where aqueous scrubbing agents of the character described are used to remove hydrogen halides from the fluorinated product, the gas will become mixed with water vapors. Subsequently, it may be conveniently dried by passing it through a drying scrubber, such as shown at O. This scrubber, as illustrated, is of the circulating type and the scrubbing liquid preferably used is concentrated sulfuric acid. If desired, instead of sulfuric acid, other reagents capable of removing water, such as, for example, stick caustic or the like, may be used.

For convenience of storage and transportation, the resultant fluorinated product from scrubber O may be liquefied. This liquefaction may be accomplished by passing the gaseous product through condensers P and Q in series, the condensate being collected in storage vessels R and S, respectively.

The invention will be more fully understood by reference to the following detailed description. For convenience, the process is described in connection with specific substances, namely, hydrogen fluoride (the fluorinating agent), perchloroethylene (the acyclic halogen derivative to be fluorinated), and a pentavalent antimony fluorochloride (the catalyst).

Referring to Fig. 1, anhydrous antimony trichloride is introduced into a steel dehydrator, illustrated at A, and a larger amount of the same material is introduced into a chrome steel reactor, generally illustrated at C. Dehydrator A is provided with a temperature-indicating device, such as a thermometer 2, and a pressure gauge 3. The temperature is maintained at about 100° C in both dehydrator A and reactor C.

Liquid chlorine is passed into dehydrator A from a pressure cylinder (not shown) through a valved inlet 4. Dehydrator A is provided with a safety vent through line 5 and valve 6. Line 7 controlled by a valve 8 connects dehydrator A with reactor C. During the initial introduction of the chlorine into dehydrator A, valves 6, 8 and 21 are closed so that the pressure gradually rises to about 100 pounds per square inch. When this pressure is attained, valve 8 is cracked and chlorine is vented through line 7 into reactor C. The temperature of dehydrator A is then preferably lowered to 15° C. to 25° C. and maintained there subsequently. The addition of chlorine is continued until the desired proportion of the antimony chloride is in pentavalent form. Anhydrous hydrogen fluoride is then passed into the antimony chloride mixture in reactor C, this introduction of hydrogen fluoride being made under super-atmopspheric pressure, preferably about 75 pounds per square inch (gauge), through a valved inlet 9 provided with a pressure gauge 10.

Reactor C is provided with a suitable temperature indicating means, such as illustrated by the thermometer 12, an agitating device 13, and a valved vent line 14. Dehydrator A and reactor C are also equipped with other safety devices, such as illustrated in the drawings. These include a line 15 from the top of dehydrator A connecting to a trap 16 and a similar line 17 from the top of reactor C connecting to a trap 18. These traps contain a portion of the liquid acyclic halogen derivative to be fluorinated, which is introduced from a reservoir B through lines 19 and 20. These liquids form a liquid seal in traps 16 and 18 for lines 22 and 23, respectively. Line 20 is equipped with a valve 21 which may be closed when it is desired to maintain a pressure differential between dehydrator A and reactor C. Valve 21 is normally closed when valve 8 is closed, and open when valve 8 is open. Line 22 connects with a safety disc 24. Line 23 connects with a safety disc 25. To guard against the loss of material resulting from the rupture of a safety disc, two extra safety discs 26 and 27 are provided on lines 22 and 23, respectively. Intermediate between the safety discs 24 and 26 on line 22 is a pressure gauge 28. Intermediate between the safety discs 25 and 27 on line 23 is a pressure gauge 29. Should either of the discs 24 or 25 become corroded and subsequently rupture, such a rupture will immediately be indicated by the rise in pressure on gauges 28 or 29. In order to prevent the accumulation of corrosive materials in traps 16 and 18, they are flushed periodically by the addition of the liquid acyclic halogen derivative from reservoir B. The material displaced overflows into dehydrator A or reactor C through lines 15 and 17, respectively.

When the catalyst has been prepared, it is heated to a temperature of about 160° C. to about 170° C. and perchloroethylene and additional hydrogen fluoride are simultaneously introduced. The perchloroethylene is preferably introduced from the weigh tank I through line 31. Alternatively, it may be introduced from a suitable storage vessel through a valved inlet 30. The introduction of chlorine into reactor C through line 7 and valve 8 is continued, valve 8 serving to maintain a pressure differential of about 25 pounds per square inch between dehydrator A and reactor C.

It is probable that the reaction taking place in reactor C produces some of each of the compounds $C_2F_4Cl_2$, $C_2F_3Cl_3$, $C_2F_2Cl_4$ and $C_2F_5Cl$. The displacement of chlorine by fluorine in the acyclic halogen derivative also produces hydrogen chloride.

The mixture of the fluorinated product and hydrogen chloride containing any intermediate products, unconsumed perchloroethylene and hydrogen fluoride leaves reactor C through line 32 connecting with a reflux column D which, for the particular fluorination reaction described, is preferably maintained at a temperature of about 100° C. to about 110° C. The reflux column D is provided with a thermometer 34 and a jacket 33 provided with an inlet and outlet means 33A and 33B, respectively, for a heat transfer fluid, such as steam.

From reflux column D the gaseous products pass through line 35, which is provided with a pressure gauge 36, into a trap E. Trap E is heated by means of a jacket 37 provided with an inlet 38 and an outlet 39 for the heat transfer medium (for example, steam). A temperature indicating device, such as shown at 40, is also provided.

The temperature of this trap may vary but, in general, with the reactants described is preferably maintained at about 90° C. to about 100° C.

From trap E the gases pass through a line 42 entering the lower part of scrubber F. Scrubber F has a surrounding jacket 43 provided with an inlet for the heat transfer medium 44 and an outlet 45. It is also provided with a temperature indicating device 46 and a pressure gauge 51. The temperature of scrubber F for the reaction described is preferably maintained at about 90° C. to about 100° C. The scrubbing liquid is perchloroethylene (the acyclic halogen derivative) which is introduced into scrubber F from a storage vessel H through a line 47. In order to increase the efficiency of the scrubbing, scrubber F is partially filled with iron rings, indicated at 48. The scrubbing liquid overflows into a line 49 which connects with a calibrated reservoir G. Line 49 is controlled by a valve 50. Reservoir G is provided with a means of indicating the temperature, shown at 52, and may also be heated by means of a suitable heat transfer medium introduced into heating coils (not shown) contained therein through an inlet 53 and withdrawn through an outlet 54. The perchloroethylene scrubbing liquid may be introduced into the reactor C by passing it through line 55 and valve 56 into a weigh tank I and thence into line 31 controlled by valve 31A. Weigh tank I is provided with a thermometer 57 and a valved vent 58. A connecting line 59 between storage vessel H and weigh tank I is provided so that, if desired, the acyclic halogen derivative to be fluorinated may be introduced into weigh tank I, from which it passes into line 31 and reactor C without first being used as a scrubbing liquid. This method of procedure is especially desirable when the compound to be fluorinated is a solid at ordinary temperatures (cf. Example III). Line 59 is controlled by valve 61.

The gaseous fluorinated product, after passing through scrubber F enters line 60 which connects scrubber F with vessel K. Vessel K is preferably cooled to a relatively low temperature in order to condense a part of the higher boiling fluorinated product and also unconverted acyclic halogen derivative. A thermometer 62 is provided to indicate the temperature in vessel K and a pressure gauge 63 is provided to indicate the pressure. For the specific reaction described, by maintaining a temperature of about 10° C. to about 15° C. in vessel K a condensate is obtained which contains mixtures of higher boiling fluorinated acyclic hydrocarbons and unfluorinated acyclic halogen derivative used as the starting material. At these temperatures, relatively large amounts of trifluoro-trichloro ethane present in the gas stream are condensed. The condensate overflows into line 64 which, in turn, connects with storage vessel L. Storage vessel L is connected to reservoir G by means of a line 65 having a valve 66 and in this manner the partially fluorinated product, as well as condensed perchloroethylene, may be returned to the reaction vessel C. If desired, additional trifluoro-trichloro ethane may be introduced into vessel K through a valved inlet 67. Line 68 provided with valves 69 and 70, a valved line 73 a valved line 74 between lines 68 and 73, and line 75 provided with valve 76 serve to equalize the pressures on the various vessels F, G, K, L and I and aid in the control of the various liquids contained therein.

The gaseous product leaving vessel K passes into a line 77 controlled by valve 78. According to the above description the super-atmospheric pressure on the entire system, i e., in the reactor C, column D, trap E, and vessels F, G, H, I, K and L, is controlled by valve 78. The pressure on the remainder of the system is released to atmospheric by valve 78. If desired, the pressure may be entirely or partially released by a valve (not shown) which is placed in the gas line 60 connecting scrubbers F and K. The temperature of K should then preferably be lowered according to the pressure. The temperature should be about 0° C. if K is under atmospheric pressure.

The gaseous product in line 77 enters the bottom of the water scrubber M shown in Fig. 2. Water scrubber M is provided with a thermometer 79. Water scrubber M has an inlet line 80 and an outlet line 82. The outlet line 82 is provided with a trap 83. The gases pass upward through water scrubber M countercurrent to the water and are then introduced into a scrubber N through line 84. In scrubber N they are treated with a dilute solution of sodium hydroxide which is withdrawn from the bottom of the scrubber through line 85 into a storage tank 86 and recirculated by means of a pump 87 through line 88 entering the top of the scrubber and flowing countercurrent to the reaction gases. A means of indicating the temperature of scrubber N is shown at 89.

The gases issuing at the top of scrubber N pass into a line 90 and enter the bottom of a scrubber O where they are treated with concentrated sulfuric acid. The circulation of the sulfuric acid is effected by withdrawing the acid through line 92 into a storage vessel 93 and then recirculating it by means of a pump 94 through a line 95. Scrubber O is provided with thermometer 96, to aid in regulating the temperature. The temperature of the various scrubbing liquids in M, N and O should preferably be sufficiently high to avoid condensation of the desired fluorinated product. Thus, where tetrafluoro-dichloro ethane and trifluoro-trichloro ethane compose the product, the scrubbers should preferably be maintained at a temperature of about 50° C. to about 55° C.

The gases from scrubber O pass into a line 97 and then into a condenser, generally illustrated at P. Condenser P comprises cooling coils 98 which are cooled by means of a suitable heat transfer medium, such as, for example, water, introduced into the condenser through line 99 and withdrawn through line 100. The condensate passes through line 102 into receiver R. Any uncondensed gases pass upward through line 103 into condenser Q. Condenser Q, as shown, is similar to condenser P and is characterized by cooling coils 104, an inlet 105 and an outlet 106 for the cooling medium (e. g., refrigerated brine). The condensate is removed through line 107 into storage vessel S. Any gases which are still uncondensed may be removed through valved outlet 108. The condensate collected in receivers R and S may be removed through valved outlets 109 and 110, respectively.

In carrying out the fluorination process, it will be recognized that various modifications may be made in the exact manner of procedure. The drawing of Fig. 1 and the above detailed description illustrate the use of F and K as non-circulating scrubbers. Circulating scrubbers may be used to advantage. With this modification it would be essential to install the necessary receivers and pumps for circulating the scrubber liquid and the corresponding receiver. With the use of certain types of scrubber for F, it may be of advantage to eliminate trap E. The gaseous fluorinated product from the reactor C may be passed directly into the trap E without going through column D, or both column D and trap E may be omitted, the gaseous fluorinated product then passing directly into the scrubber F. Scrubber F may also be omitted from the construction of the apparatus, but the results obtained are much less desirable since, as previously described, this scrubber serves to remove volatilized antimony halides and return them to the reaction zone, thereby effecting a saving in the cost of operation.

The use of relatively high temperatures in scrubber F is desirable in order to efficiently remove the antimony halides, since the antimony halides are much less soluble in the perchloroethylene or intermediate fluorinated products at relatively low temperatures.

The vessel K may also be omitted from the construction of the apparatus, but the final product in this case will contain excessive proportions of trifluoro-trichloro ethane and appreciable amounts of other partially converted acyclic halogen derivatives and of the original organic raw material. These compounds could be separated from the tetrafluoro-dichloro ethane and used as such or returned to the reactor C, but this type of process involves the disadvantage that it is necessary to purify and recover relatively large amounts of the compounds described, at an added cost. It has also been found that the chloride or other halogen used in preparing the catalyst and subsequently introduced into the reaction zone during the fluorination process may be ordinary commercial chlorine (or other halogen) and that, therefore, the dehydrator A is not essential to the operation of the process. It will be recognized that the safety devices provided may vary widely according to details well known in the art. The various temperature indicating devices and pressure gauges indicated at different parts of the system may not be essential but are desirable for specific reasons. The desirability of using the pressure gauges 28 and 29 has already been indicated. It will be recognized, furthermore, that such devices are desirable on the dehydrator A and the reactor C in order that the pressures attained may not become higher than the apparatus is capable of withstanding. The pressure gauges indicated at 36, 51 and 63 serve an additional purpose in that they facilitate the determining of the location of any antimony plugs that might occur.

Since the apparatus shown is merely diagrammatic, it will be understood that the various portions of the apparatus may be placed differently with respect to each other. Thus, the storage vessels from which the acyclic halogen derivative to be fluorinated is introduced into the reactor C are normally placed so that the liquid acyclic halogen derivative may be introduced by gravity. If desired, however, such introduction may be made by pumping or in any other suitable manner. The various portions of the apparatus are only conventionally illustrated and may vary widely in details. Thus, the column D may be plated or of any other suitable design. Other suitable scrubbers, such as those of the non-circulating type, may be employed. The condensers may be tubular instead of coiled, and various other changes may be made.

Portions of the apparatus which come into contact with hydrogen halides during the reaction have usually been constructed or lined with some corrosion-resistant material, such as copper, a chromium alloy steel, molybdenum containing alloy steel or monel metal. Mild steel has given reasonably satisfactory service. The discovery that the process may be operated satisfactorily with apparatus constructed of steel, chromium alloy steels and molybdenum alloy steels is particularly valuable because of the fact that these materials of construction will withstand high temperatures and super-atmospheric pressures much better than materials such as copper. In certain instances, as, for example, in the water scrubber M, it may be desirable to construct the hydrogen halide removers of phenol formaldehyde condensation products, of lead or similar material. After the corroding materials have been removed from the gas stream, ordinary materials of construction may be used, for example, cast iron, wrought iron, mild steel and the like.

The invention will be further understood, particularly as regards proportions of materials, temperatures and pressures, from a consideration of the following examples, in which the parts are given by weight.

*Example I*

In an apparatus similar in principle to that described in the drawings, approximately 75 parts of anhydrous antimony trichloride were charged into the steel dehydrator A and 880 parts of the same material were charged into the chromium steel reactor C. The temperatures of A and C were raised to about 100° C.

Liquid chlorine was introduced into the dehydrator A through valved inlet 4 at the rate of about 15 parts per hour. Valves 6, 8 and 21 were kept closed during this operation. When 23 parts of chlorine had been added, practically all of the antimony trichloride in dehydrator A was converted to antimony pentachloride and the pressure in dehydrator A, as indicated by pressure gauge 3, then gradually rose. When the pressure had reached 100 pounds per square inch, valve 8 was cracked and chlorine vented into reactor C. In the meantime, dehydrator A was cooled to 15° C. to 25° C. The addition of chlorine was continued until a total of 200 parts had been added. Reactor C then contained approximately 830 parts of antimony pentachloride and 250 parts of antimony trichloride.

Valve 8 between dehydrator A and reactor C and valve 78 between vessel K and water scrubber M were then closed. Liquid hydrogen fluoride was introduced into reactor C through line 9 at the rate of about 8 parts per hour. The evolution of hydrogen chloride accompanying this operation resulted in the generation of pressure on the entire system up to valve 78. When the pressure had reached 75 pounds per square inch, valve 78 was cracked and the hydrogen chloride was vented into scrubber M (Fig. 2).

Hydrogen fluoride was continuously introduced into reactor C at the rate of 8 parts per hour until 140 parts of it had been added. Additional hydrogen fluoride was introduced at the rate of 4 parts per hour until a total of 160 parts of the material had been added. The antimony compound in reactor C then contained about 14% fluorine.

The temperature of the catalyst in reactor C was raised to 160° C to 170° C. Hydrogen fluoride and perchloro ethylene were then introduced into the catalyst at the following hourly rates:

| | Parts |
|---|---|
| Hydrogen fluoride | 3.0 |
| Chlorine | 2.5 |
| Perchloro ethylene | 5.9 |

In the early stages of operation the fluorinated product produced was largely trifluoro-trichloro ethane, most of which was removed from the reaction gases in scrubber F and vessel K, from which it was returned to the catalyst mixed with perchloro ethylene in the manner previously described in connection with the drawings. The amount of these liquids recirculated into the catalyst was gradually increased up to about 40 to 50 parts per hour. The production of tetrafluoro-dichloro ethane simultaneously increased until it finally reached about 4 parts per hour. The fluorinated product, comprising substantially tetrafluoro-dichloro-ethane and trifluoro-trichloro ethane, was condensed in condensers P and Q and recovered in receivers R and S, respectively. P and R were maintained at about 0° C.; Q and S at about −20° C. Approximately 33 parts of trifluoro-trichloro ethane were produced with every 100 parts of tetrafluoro-dichloro ethane.

As the production of tetrafluoro-dichloro ethane increased, the amount of perchloroethylene introduced into scrubber F from storage tank H was gradually increased up to 5.9 parts per hour. The addition of chlorine to the reactor C at the rate of 2.5 parts per hour was also continued until sufficient chlorine had been added to theoretically convert all of the perchloroethylene initially added to the scrubber to hexachloroethane. Thereafter, chlorine was added to reactor C at the rate of 0.43 part for each one part of perchloroethylene which was added to scrubber F. After the process had been operated for sufficient time to accumulate a supply of trifluoro-trichloro ethane by fractionation of the product recovered in condensers R and S, this material was introduced into the scrubber F along with perchloroethylene. A small proportion of this trifluoro-trichloro ethane was daily introduced into the system from reservoir B through the traps 16 and 18 which served as safety disc protectors. After continuous operation had been established, the hourly introduction of raw materials into the system was:

| | Parts |
|---|---|
| Chlorine | 2.0 |
| Perchloroethylene | 4.75 |
| Trifluoro-trichloro ethane | 1.25 |
| Hydrogen fluoride | 2.5 |

The pressure in the reaction zone was about 70 to about 125 pounds per square inch.

Example II

Five parts of the catalyst which was prepared by the procedure described in Example I was removed from reactor C and heated to about 140° C. to about 150° C. in a small autoclave bomb with one part of hexachloro ethane for five hours. Upon cooling and opening the bomb and distilling the product, a 75% yield of a mixture of tetrafluoro-dichloro ethane and trifluoro-trichloroethane was obtained.

Example III

The process of Example I was carried out, except that hexachloro ethane was substituted for perchloroethylene as the starting material. Previously prepared trifluoro-trichloro ethane was used in the scrubbers F and K. The hexachloro ethane was dissolved in heated trifluoro-trichloro ethane in reservoir H under pressure, and the liquid mixture was then fed to weigh tank I through line 59 and subsequently to reactor C through line 31 without first passing through scrubber F and reservoir G. The recovered fluorinated product was a mixture comprising substantially tetrafluoro-dichloro ethane and trifluoro-trichloro ethane.

Example IV

Instead of a single reactor at C, two chrome steel reactors were connected in series and into each were charged 250 parts of antimony trichloride and 250 parts of antimony pentachloride. The temperatures of both reactors were raised to 90° C. to 100° C., which temperature range was maintained during the following preparation of the catalyst. Liquid hydrogen fluoride was fed into the first reactor at the rate of about 8 parts per hour under a super-atmosphere pressure of about 75 pounds per square inch. The effluent gases from the first reactor were vented into the second reactor. As the fluorination of the catalyst progressed, the amount of hydrogen fluoride utilized by the first catalyst decreased until finally practically all of it passed into the second catalyst. When a total of 180 parts of hydrogen fluoride had been introduced, the introduction of hydrogen fluoride was stopped. At this point, the first catalyst contained approximately 20% fluorine and the second catalyst about 13% fluorine.

The temperature of the first catalyst was then raised to about 150° C. to about 160° C. and that of the second catalyst to about 145° C. to about 155° C. While maintaining a pressure of 75 to 80 pounds per square inch, hydrogen fluoride and trifluoro-trichloro ethane were added to the first catalyst and hexachloroethane dissolved in trifluoro-trichloro ethane at 170° C. to 180° C. under pressure was fed to the second catalyst at the following hourly rates:

Hydrogen fluoride__2.5 parts
Hexachloro ethane__6.75 parts dissolved in one part of trifluoro-trichloro ethane
Trifluoro-trichloro ethane__40 to 50 parts The fluorinated product, comprising substantially tetrafluoro-dichloro ethane and trifluoro-trichloro ethane, was condensed in the manner described in Example I.

Example V

In an apparatus similar in principle to that shown in the drawings, a catalyst was prepared in reactor C as described in Example I. While maintaining a temperature of about 160° C. to about 170° C. and a pressure of about 75 pounds per square inch (gauge), hydrogen fluoride and carbon tetrachloride were introduced into the reaction zone at the rate of about 2.8 parts of hydrogen fluoride per hour and 6.0 parts of carbon tetrachloride per hour.

The process was operated without the use of scrubber F and vessel K; the carbon tetrachloride was introduced directly into reactor C. After extended periods of operation, clogging of the lines frequently resulted.

The reaction gases were passed through scrubbers M, N and O to condenser P. The condensed liquid was collected in reservoir R. The temperature of scrubber M was about 20° C., of scrubber N about -20° C. and of scrubber O about 20° C. Condenser P and reservoir R were cooled to a temperature of −70° C. to −75° C. by means of a carbon dioxide-acetone mixture. The final product comprised substantially trifluoro-chloro methane and difluoro-dichloro methane.

Example VI

An apparatus similar to that described with reference to the drawings was used. The catalyst was prepared according to the directions given in Example I. Subsequently, its temperature was maintained at about 160° C. to about 170° C.

Scrubber F was filled to the overflow point with tetrachloro ethane. Vessel K was only partially filled with the same material. Subsequently, all additions of tetrachloro ethane were made to scrubber F from which the tetrachloro ethane in admixture with other materials that condensed in this scrubber was fed to the catalyst. As the material was withdrawn from scrubber F, it was replenished by fresh tetrachloro ethane from reservoir H.

The hourly feeds to the catalyst were maintained as follows:

| | Parts |
|---|---|
| Hydrogen fluoride | 3.0 |
| Chlorine | 5.4 |
| Tetrachloro ethane | 6.0 |

As the proportion of tetrachloro ethane in the scrubbing liquid in scrubber F decreased, the rate of adding the scrubbing liquid was increased.

The temperature of reflux column D was about 100° C. to about 110° C., of trap E and scrubber F about 90° C. to about 100° C., of vessel K about 10° C. to about 15° C., of scrubber M about 55° C., of scrubber N about 55° C., and of scrubber O about 55° C. Condenser P was water-cooled to a temperature of about 5° C., and condenser Q was brine-cooled to a temperature of about −20° C. Receivers R and S were both cooled sufficiently to maintain the products in liquid form. The final product, recovered in receivers R and S, was a mixture of highly fluorinated chloro ethanes, including tetrafluoro-dichloro ethane. Most of it could be separated by fractional distillation into products that boiled at about 5° C. and 47° C. The total yield of products that boiled below 50° C., was about 85%.

At times the process was operated without the use of scrubber F and vessel K, the tetrachloro ethane then being introduced directly into the reaction zone from a suitable reservoir (not shown) through valved inlet 30. After extended periods of operation, clogging of the process lines frequently resulted.

Example VII

Approximately 350 parts of antimony trichloride and 650 parts of antimony pentachloride were introduced into a chrome steel reactor and subsequently about 105 parts of hydrogen fluoride (98% HF) were added at approximately the rate of 5 parts per hour. A temperature of about 100° C. and a pressure of about 100 to 110 pounds per square inch were maintained. Subsequently, the temperature of the catalyst was maintained at about 170° C. to about 175° C. under a pressure of about 100 to 110 pounds per square inch (gauge), and the process described in Example VI was carried out except that trichloro ethylene was used instead of tetrachloro ethane. The following hourly feeds of the reactants were maintained:

| | Parts |
|---|---|
| Hydrogen fluoride | 3.0 |
| Chlorine | 5.4 |
| Trichloro ethylene | 4.8 |

The fluorinated product was recovered as described in Example VI. It was a mixture of highly fluorinated chloro ethanes, including tetrafluoro-dichloro ethane and trifluoro-trichloro ethane. Fractional distillation resulted primarily in the recovery of two fractions that boiled, respectively, at about 4° C. and at about 47° C.

Example VIII

Hydrogen fluoride was passed into a mixture of 4.5 parts of antimony pentachloride and 0.5 part of antimony trichloride at a temperature of about 100° C. under pressure of about 75 pounds per square inch (gauge) until the product contained about 20% fluorine, and the resultant product was then heated under autogenous pressure with the addition of one part of perchloroethylene at a temperature of about 140° C. to about 150° C. for five hours. The autoclave was cooled and opened, and the product distilled whereby a 75% yield of a mixture of trifluoro-trichloro ethane (B. P. 47.7° C.) and tetrafluoro-dichloro ethane (B. P. 3.6° C.) was obtained.

Example IX

The procedure described in Example VIII was repeated except that trichloroethylene was used instead of perchloroethylene. The product was similar to that of Example VII.

Example X

Liquid hydrogen fluoride was introduced into a mixture of 8 parts of antimony pentachloride and 2 parts of antimony trichloride under a pressure of about 75 pounds per square inch (gauge) and at a temperature of about 100° C. to about 110° C. until the fluorine content of the product was about 20%. The resultant product was then reacted without about 2 parts of pentachloro ethane in an autoclave under autogenous pressure at a temperature of about 140° C. to about 150° C. for five hours. Upon cooling and opening the autoclave and distilling the product, a good yield of a mixture of fluorinated products, including tetra-fluoro-dichloro ethane and trifluoro-trichloro ethane was obtained.

Example XI

Approximately 7 parts of an antimony fluorochloride catalyst was prepared as described in Example I by the reaction of hydrogen fluoride with a mixture of antimony trichloride and antimony pentachloride, and the resultant product then reacted with about one part of tetrachloro ethane in a small autoclave at a temperature of about 140° C. to about 150° C. for five hours. The product, obtained upon cooling, opening the bomb, and distilling the reaction mixture, contained highly fluorinated chloro ethanes.

Example XII

The procedure described in Example VIII was repeated except that $C_2F_3Cl_3$ was used as the raw material instead of perchloroethylene, and the reaction temperature was 150° C. to 160° C. instead of 140° C. to 150° C. The yield of $C_2F_4Cl_2$ (B. P. 3.6° C.) was about 80%.

Example XIII

Hydrogen fluoride reacted with $C_2H_2Cl_4$ at about 125° C. under about 10 pounds per square inch (gauge) pressure in the presence of a mixed antimony penta- and trivalent chloride catalyst (containing about 48% trivalent Sb) yielded hydrogen-containing fluorinated compounds. Examples of these compounds are $C_2H_2F_2Cl_2$, $C_2H_2F_3Cl$ and $C_2HF_3Cl_2$.

Example XIV

The apparatus employed was similar to that described with reference to the drawings except that dehydrator A, column D, trap E, scrubber F, vessels G, I, K and L, condenser Q and reservoir S were omitted from the construction of the apparatus.

The catalyst was prepared by gradually adding 150 parts of hydrogen fluoride to a mixture of 650 parts of antimony pentachloride and 350 parts of antimony trichloride at a temperature of 100° C. to 110° C. under a pressure of 75 pounds per square inch (gauge) in reactor C. Subsequently, the catalyst was maintained at a temperature of about 150° C. to about 175° C. and the pressure of the system at about 100 to 110 pounds per square inch (gauge). A mixture containing 80% tetrachloro ethane, 15% pentachloro ethane and smaller proportions of hexachloro ethane and perchloro ethylene was added to the catalyst at a rate of 6 parts per hour through line 30. Hydrogen fluoride was added at the rate of 3 parts per hour. Chlorine was added at such a rate that the effluent vapors contained appreciable proportions of free chlorine. The scrubber M was maintained at a temperature of about 55° C., scrubber N at a temperature of about 55° C. and scrubber O at a temperature of about 55° C. The neutral dry fluorinated product was liquefied in condenser P and recovered in receiver R. Condenser P was maintained at a temperature of about −20° C. by cooling with refrigerated brine. Receiver R was cooled to about 20° C. in order to maintain the product in liquid form. The combined yield of organic fluorine compounds, boiling below 50° C., was approximately 90% over a period of twenty hours.

A halogenated hydrocarbon raw material similar to that used in Example XIV may conveniently be the reaction product of the combination of chlorine and acetylene in the presence of a catalyst, e. g., ferric chloride or antimony pentachloride.

Example XV

The apparatus, illustrated in Fig. 1, was simplified by the elimination of all vessels excepting C and D. The vapors from D were passed directly to scrubber M, shown in Fig. 2. The final product was recovered in the same manner as that of Example I.

During the operation of the process, D was maintained at 50° C. to 60° C.

To reactor C there were added 1000 parts of antimony pentachloride. The temperature was raised to 75° C. to 85° C. Hydrogen fluoride was added at atmospheric pressure to the mixture until the fluorine content of the latter was approximately 17%. This operation required eight hours.

The temperature of the fluorinated antimony halide was raised to 165° C. during four hours and then held between 160° C. and 170° C. for twelve hours. During the heating period and during the subsequent five hours, there were gradually added 200 parts of a heated mixture, containing hexachloro ethane and trifluoro-trichloro ethane in the ratio of 3 to 1. The pressure was allowed to rise to 100 pounds per square inch and was subsequently held between 90 and 100 pounds per square inch during this phase of the operation. The vented vapors were passed through the purifying system and condensed in the usual manner.

The temperature was gradually decreased to 115° C. during a two-hour period. The pressure was then decreased to 50 pounds per square inch by venting in the usual manner.

Hydrogen fluoride was again added until the fluorine content was about 17%. In addition, 15 parts of chlorine were added. The gases were passed to the usual purifying train. During the hydrogen fluoride addition the temperature was maintained within the range of about 105° C. to about 115° C., and the pressure between 50 and 60 pounds per square inch.

The temperature was again raised and maintained, and the hexachloroethane-trifluoro-trichloro-ethane mixture added in the manner described above.

Subsequently, the above cycle was repeated for an undetermined number of times.

There was obtained from each cycle approximately 125 parts of fluorinated product. The latter contained approximately 60% tetrafluoro-dichloro ethane, 35 parts of trifluoro-trichloro ethane, and smaller amounts of difluoro-tetrachloro ethane.

According to procedures similar to those described above, fluorinated derivatives of ethane may be produced from any one of the following compounds:

Hexachloro ethane ($C_2Cl_6$)
Pentachloro ethane ($C_2HCl_5$)
Tetrachloro ethane ($C_2H_2Cl_4$)
Dichloro ethane ($C_2H_4Cl_2$)
Ethyl chloride ($C_2H_5Cl$)
Dichloro ethylene ($C_2H_2Cl_2$)
Trichloro ethylene ($C_2HCl_3$)
Perchloro ethylene ($C_2Cl_4$)
Ethylene dibromide ($C_2H_2Br_2$)
Tribromethane ($C_2H_3Br_3$)

It will be recognized that the exact method of procedure may vary, however, depending upon the specific compound treated. In general, highly fluorinated acyclic hydrocarbon derivatives may be prepared by the fluorination at high temperatures and elevated pressures as herein described of any acyclic hydrocarbon derivatives containing a halogen other than fluorine. The fluorination process may involve the treatment of saturated or unsaturated halogenated hydrocarbons which may or may not contain hydrogen in the molecule. Thus, hexachloro ethane and carbon tetrachloride are representative of compounds which are saturated and contain no hydrogen. Pentachloro ethane, tetrachloro ethane, dichloro ethane, ethyl chloride, chloroform, methylene chloride and the like are representative of saturated halogenated acyclic hydrocarbons containing hydrogen. Dichloro ethylene, trichloro ethylene and ethylene dibromide are representative of unsaturated halogenated hydrocarbons containing hydrogen. Perchloro ethylene is representative of an unsaturated halogenated hydrocarbon not containing hydrogen. As further examples of compounds which may be fluorinated in accordance with the invention may be mentioned tetrachloro butane, allyl bromide, hexachloro hexalene, allyl iodide and bromoform. As indicated by the foregoing examples, partially fluorinated compounds are included among the compounds which may be further fluorinated in accordance with the invention. While the invention is applicable to the replacement by fluorine of halogens other than fluorine (that is, chlorine, bromine and/or iodine) contained in halogenated acyclic hydrocarbons, it is especially valuable for the fluorination of chlorinated acyclic hydrocarbons since, in general, the replacement by fluorine of chlorine is more difficult than the replacement by fluorine of bromine or iodine.

It has been indicated that fluoro-chloro derivatives of acyclic hydrocarbons may be obtained not only by the fluorination of chlorinated acyclic hydrocarbons, but also by the fluorination of brominated acyclic hydrocarbons in the presence of chlorine and an antimony chloride catalyst. Fluro-bromo acyclic hydrocarbon derivatives may be produced by the reaction of a brominated acyclic hydrocarbon with hydrogen fluoride and bromine in the presence of an antimony bromide catalyst. Where the compound to be fluorinated is unsaturated or contains hydrogen, the presence of added free halogen during the fluorination reaction favors an addition of halogen to the unsaturated compounds and the replacement of hydrogen by halogen in the compounds originally containing hydrogen. As a general rule, therefore, although it is not essential, it is especially desirable to introduce a free halogen into the reaction zone when the compound to be fluorinated contains hydrogen and/or is unsaturated.

As indicated by the examples, the benefits of effecting the fluorination in the presence of a free halogen are not confined to the fluorination of unsaturated compounds and/or compounds containing hydrogen, but are also obtained in the fluorination of saturated halogenated acyclic hydrocarbon derivatives, such as, for example, hexachloro ethane. Such benefits are evidenced particularly by the fact that the presence of added free halogen tends to maintain the desired pentavalent halide content of the catalyst.

The composition of the antimony halide used in effecting the fluorination may vary within relatively wide limits. The catalyst may be prepared as described in the examples, or in any other suitable manner. Instead of preparing the catalyst by treating a mixture of the antimony pentahalide and antimony trihalide with hydrogen fluoride, halogen and hydrogen fluoride may be passed into antimony trihalide until the desired pentavalent antimony and fluorine contents are obtained. The introduction of the hydrogen fluoride or halogen, or of both hydrogen fluoride and halogen, into the antimony halide and the introduction of the halogenated acyclic hydrocarbon derivative to be fluorinated may be made intermittently or simultaneously. With continuous operation it is preferable to build up the fluorine content of the antimony catalyst to an optimum condition before starting the addition of the halogenated hydrocarbon. Thereafter, halogenated hydrocarbon, hydrogen fluoride and halogen are then fed continuously or intermittently at rates that are designed to produce the desired product or products without extensive changes in the composition of the antimony fluorohalide. The presence of a trivalent antimony halide in the catalyst mixture is of special In general, the antimony catalysts which we have sure of the catalyst and its ease of dissociation. In general, the antimony catalysts which we have found to be particularly valuable in the fluorination are those containing compositions represented empirically by $$SbF_xHal_{5-x}$$

in which Hal represents a halogen other than fluorine and $x$ represents a positive value less than 5. Very desirable results have been obtained in the production of fluoro-chloro acyclic hydrocarbon derivatives by a fluorination in the presence of an antimony halide having the general formula given above, in which Hal represents chlorine. Antimony fluorochlorides containing 6% to 21% (which corresponds to $x$ of about 3) fluorine have given especially advantageous results. The proportions of pentavalent and trivalent antimony may be varied over essentially the entire possible range, according to the results desired. A preferred pentavalent antimony halide range is 70% to 90% by weight of the total antimony catalyst, especially when it is desired to produce completely halogenated fluoro-halo compounds. Higher proportions of trivalent antimony halide favor the production of fluoro compounds containing hydrogen (cf., Example XIII).

In practising the invention, it is desirable to use a relatively large volume of the antimony halide, since an excess of the fluorinated antimony halide favors the introduction of more than one fluorine atom while an excess of the acyclic halogen compound favors the introduction of smaller amounts of fluorine. Generally speaking, it is desirable to have the antimony-containing reaction mass in liquid condition. This physical state may be maintained by various means, such as by having present an inert material, for example, a previously fluorinated compound liquid at the temperature employed, a highly halogenated aryl compound, or the like. The presence of trivalent antimony halides and the use of super-atmospheric pressures also tends to preserve the reaction mass in liquid form.

The hydrogen fluoride may be added as a liquid or in vapor form. It will be recognized that where it is added as one form the temperature and pressure conditions may be such as to immediately reduce it to the other form. The term "hydrogen fluoride" is intended to include and to cover not only the pure product but also hydrogen fluoride or hydrofluoric acid which may contain small amounts of impurities, as, for example, water. The presence of water in the various reactants is, however, generally undesirable and it is preferable to use substantially anhydrous hydrogen fluoride.

The exact method of procedure in introducing the reactants into the reaction zone is subject to some variation. The hydrogen fluoride and the acyclic halogen derivative may, if desired, be added in one stream; for example, the hydrogen fluoride gas may be passed through the liquid acyclic halogen derivative, thereby producing a mixture of vapors to be introduced into the reactor. Where the acyclic halogen is a solid under the conditions of reaction or may be solid under the conditions of reaction, as, for example, in the case of hexachloro ethane, it is preferably dissolved in an inert solvent or a compound capable of being further fluorinated (cf., Examples III and IV).

In the production of compounds having relatively high boiling points or compounds which may be decomposed at temperatures below the temperatures at which they will vaporize under the pressure conditions used in the reaction zone, it will be recognized that the reaction products may not be recovered in the form of gases, as described with reference to the drawings, but will be recovered directly in liquid or solid form from the reaction mixture.

The temperatures and pressures of fluorination in accordance with the invention may be varied widely. The formation of higher fluorinated hydrocarbons increases above about 95° C. Lower temperatures, in general, lead to the production of larger proportions of less highly fluorinated compounds. Satisfactory results have been obtained in the use of temperatures as high as 225° C. Higher temperatures, which do not cause decomposition of the reactants or products, may be used. For the production of trifluoro-trichloro ethane temperatures around 100° C. are satisfactory although higher temperatures are preferred; for the production of fluorinated methanes containing more than two atoms of fluorine and fluorinated ethanes containing at least two atoms of fluorine per atom of carbon, it is preferable to employ temperatures of at least 125° C. and especially desirable results have been obtained in the use of temperatures of about 150° C. to 175° C.

The pressure may vary within relatively wide limits, but, in general, should preferably be regulated to maintain the antimony halide in liquid phase while allowing vaporization of the organic fluorine compounds. Under some temperature conditions, super-atmospheric pressures of 5 to 10 pounds per square inch (gauge) have been used. Generally speaking, at temperatures above about 125° C., it is preferable to employ pressures within the range of about 40 to about 200 pounds per square inch. Higher pressures may be used. In the production of polyfluoro-chloro hydrocarbons containing less than three carbon atoms, especially desirable results have been obtained in the use of pressures of about 60 to 155 pounds per square inch over a temperature range of 150° C. to 175° C.

The reaction and the separation or isolation of the products by distillation, fractionation or otherwise, may be carried out simultaneously or in separate steps. In the latter case, it is not necessary that the pressure of the two steps be the same.

The products of the invention find application for various commercial purposes. Thus, tetrafluoro-dichloro ethane possesses desirable properties for use as a refrigerant. Some of the higher boiling compounds, such as trifluoro-trichloro ethane, are generally applicable for use as solvents or reaction media.

The process possesses many advantages of a practical and economical nature. It is characterized by ease of control and smoothness of operation and provides a means of producing highly fluorinated acyclic hydrocarbons on a commercial scale. The specific combination of high temperature and pressure in the production of organic fluorine compounds in the presence of a catalyst which is liquid under the conditions of reaction has not heretofore been described.

Throughout the specification and claims it will be understood that the term "halogenated acyclic hydrocarbon" includes open chain compounds of the paraffine and unsaturated type, in which a part or all of the hydrogen atoms have been replaced by a halogen.

By the terms "continuous" and "continuously" as used in the specification and claims with respect to the introduction of reactants into the reaction zone and the withdrawal of reaction products, it is intended to cover their interrupted introduction and/or withdrawal, as in a semi-continuous process, as well as their uninterrupted introduction and/or withdrawal.

So much of the present application as relates broadly to the fluorination of halogenated acyclic hydrocarbons is claimed in our co-pending application Serial No. 717,514 filed March 26, 1934.

As many apparently widely different embodiments of this invention may be made without departing from the spirit and scope thereof, it is to be understood that we do not limit ourselves to the specific embodiments thereof except as defined in the following claims.

We claim:

1. In a process of preparing fluorinated ethane derivatives, the step which comprises passing hydrogen fluoride and a halogenated acyclic hydrocarbon containing two carbon atoms and halogen other than fluorine into an antimony halide, and maintaining the reaction zone at a temperature above 95° C. under superatmospheric pressure.

2. In a process of preparing fluorinated ethane derivatives, the step which comprises passing hydrogen fluoride, a free halogen and a halogenated acyclic hydrocarbon containing two carbon atoms and halogen other than fluorine into an antimony halide and maintaining the reaction zone at a temperature above 95° C. under super-atmosperic pressure.

3. In a process of producing fluorinated ethane derivatives, the step which comprises passing hydrogen fluoride, chlorine and a chlorinated acyclic hydrocarbon containing two carbon atoms into an antimony chloride and maintaining the reaction zone at a temperature above 95° C. under super-atmospheric pressure.

4. In a process of producing fluorinated ethane derivatives, the step which comprises passing hydrogen fluoride, chlorine and a chlorinated ethane into an antimony chloride and maintaining the reaction zone at a temperature above 95° C. under super-atmospheric pressure.

5. A continuous process for the production of halogenated ethanes containing fluorine, which comprises continuously passing hydrogen fluoride, chlorine and a chloro hydrocarbon containing two carbon atoms into an antimony chloride catalyst containing a composition represented empirically by $$SbF_xCl_{5-x}$$

in which $x$ represents a positive value less than 5, maintaining the reaction zone at a temperature above about 95° C. under a super-atmospheric pressure, and continuously removing the vaporized fluorinated ethanes from the reaction zone.

6. A continuous process for the production of halogenated ethanes containing fluorine, which comprises continuously passing hydrogen fluoride, chlorine and a chloro hydrocarbon containing two carbon atoms into an antimony chloride catalyst containing a composition represented empirically by $$SbF_xCl_{5-x}$$

in which $x$ represents a positive value less than 3, maintaining the reaction zone at a temperature above about 125° C. under a super-atmospheric pressure of at least 40 pounds per square inch, and continuously removing the vaporized fluorinated ethanes from the reaction zone.

7. A continuous process for the production of halogenated ethanes containing fluorine which comprises continuously passing hydrogen fluoride, chlorine and a poly-chloro ethane which may contain not more than three atoms of fluorine into an antimony chloride catalyst containing a composition represented empirically by $$SbF_xCl_{5-x}$$

in which $x$ represents a positive value less than 3, maintaining the reaction zone at a temperature within the range of about 150° C. to about 175° C. under a super-atmospheric pressure of about 40 to about 200 pounds per square inch, and continuously removing the vaporized fluorinated acyclic hydrocarbons from the reaction zone.

8. A continuous process for the production of halogenated ethanes containing fluorine which comprises continuously passing hydrogen fluoride, chlorine and a poly-chloro ethane which may contain not more than two fluorine atoms into an antimony chloride catalyst containing a composition represented empirically by $$SbF_xCl_{5-x}$$

in which $x$ represents a positive value less than 3, maintaining the reaction zone at a temperature above about 125° C. under a super-atmospheric pressure of at least 40 pounds per square inch, and continuously removing the vaporized fluorinated ethanes from the reaction zone.

9. In a process of producing halogenated ethanes of varying fluorine content the steps which comprise passing hydrogen fluoride, chlorine and a chloro ethane into a series of antimony chloride catalysts containing a composition represented empirically by $$SbF_xCl_{5-x}$$

in which $x$ represents a positive value less than 3, maintaining the fluorine content of each successive catalyst lower than that of the preceding catalyst, while maintaining a temperature above about 125° C., effecting the reactions under super-atmospheric pressure, and continuously removing the vaporized fluorinated acyclic hydrocarbons from the reaction zone.

10. In a process of producing highly fluorinated ethane derivatives containing chlorine, the step which comprises reacting together hydrogen fluoride and perchloroethylene in the presence of a pentavalent antimony fluoro-chloride, and maintaining the reaction zone at a temperature of at least 125° C. under super-atmospheric pressure.

11. A process for the production of tetra-fluoro-dichloro ethane which comprises passing hydrogen fluoride, chlorine and hexachloro ethane into an antimony halide catalyst containing a composition represented empirically by $$SbF_xCl_{5-x}$$

in which $x$ represents a positive value less than 3, and maintaining the reaction zone at a temperature within the range of about 150° C. to about 175° C. under a super-atmospheric pressure of about 60 to about 125 pounds per square inch.

12. A process for the production of tetra-fluoro-dichloro ethane which comprises passing hydrogen fluoride and hexachloro ethane into an antimony halide catalyst containing a composition represented empirically by $$SbF_xCl_{5-x}$$

in which $x$ represents a positive value less than 3, and maintaining the reaction zone at a temperature within the range of about 150° C. to about 175° C. under a super-atmospheric pressure of about 60 to about 125 pounds per square inch.

13. A process for the production of tetra-fluoro-dichloro ethane which comprises passing hydrogen fluoride and a solution of hexachloro ethane in trifluoro-trichloro ethane into an antimony halide catalyst containing a composition represented empirically by $$SbF_xCl_{5-x}$$

in which $x$ represents a positive value less than 3, and maintaining the reaction zone at a temperature within the range of about 125° C. to 225° C. under a super-atmospheric pressure of about 40 to about 200 pounds per square inch.

14. A process for the production of tetra-fluoro-dichloro ethane which comprises passing hydrogen fluoride into a reaction zone containing antimony pentachloride, subsequently introducing into the reaction zone hexachloro ethane, and maintaining the reaction temperature above about 125° C. under super-atmospheric pressure.

15. A process for the production of tetra-fluoro-dichloro ethane which comprises passing hydrogen fluoride into antimony pentachloride at a temperature of about 75° C. to 85° C. until the fluorine content of the resultant product is about 17% by weight, subsequently raising the temperature to about 150° C. to about 175° C. under a super-atmospheric pressure of about 60 to about 125 pounds per square inch, introducing a heated mixture of hexachloro ethane and trifluoro-trichloro ethane into the reaction zone while maintaining the said temperature and pressure conditions, removing the evolved vapors, then reducing the temperature and pressure, adding further hydrogen fluoride to maintain a fluorine content of about 17%, adding the chlorine, thereafter introducing a heated mixture of hexachloro ethane and trifluoro-trichloro ethane while maintaining the reaction zone at a temperature of about 150° C. to about 175° C. under a super-atmospheric pressure of about 60 to about 155 pounds per square inch, and continuing the operation as before.

16. The process of producing tetrafluorodichloro ethane which comprises continuously passing gaseous hydrogen fluoride, chlorine and perchloro ethylene into a reaction zone containing a pentavalent antimony fluoro-chloride at a temperature of about 160° C. to about 170° C. under a super-atmospheric pressure of about 40 to about 200 pounds per square inch, continuously withdrawing the evolved vapors through a reflux, purifying the issuing vapors by passing them successively through the perchloro ethylene which is introduced into the reaction zone, water, a dilute solution of sodium hydroxide, and concentrated sulfuric acid, while maintaining a temperature in the various purifying media insufficient to condense the tetrafluoro-dichloro ethane, subjecting the resultant vapors to condensation, and recovering the tetrafluoro-dichloro ethane by fractional distillation.

17. In a process of preparing halogenated ethane derivatives containing fluorine, the step which comprises bringing together hydrogen fluoride, a halogenated acyclic hydrocarbon containing two carbon atoms and at least one halogen atom other than fluorine, and an antimony halide.

18. The process of claim 17 in which the reaction is effected at a temperature above 95° C.

19. The process of claim 17 in which the halogenated acyclic hydrocarbon is a poly-chloro ethane.

20. The process of claim 17 in which the halogenated acyclic hydrocarbon is a poly-chloro ethylene.

21. In a process of preparing halogenated ethane derivatives containing fluorine, the step which comprises bringing together hydrogen fluoride, a halogenated acyclic hydrocarbon containing two carbon atoms and at least one halogen atom other than fluorine, and a mixture of pentavalent and trivalent antimony halides in which the amount of pentavalent antimony halide is at least 70% by weight of the mixture.

22. In a process of preparing halogenated ethane derivatives containing fluorine, the step which comprises bringing together hydrogen fluoride, a halogenated acyclic hydrocarbon containing two carbon atoms and at least one halogen atom other than fluorine, and a mixture of tri- and pentavalent antimony halides in which the amount of trivalent antimony halide is more than 30% by weight of the mixture.

23. In a process of preparing halogenated ethane derivatives containing fluorine, the step which comprises passing hydrogen fluoride, chlorine and a chloro-ethane into an antimony chloride.

24. In a process of preparing halogenated ethane derivatives containing fluorine, the step which comprises passing hydrogen fluoride, chlorine and a chloro-ethylene into an antimony chloride.

25. In a process of preparing halogenated ethane derivatives containing fluorine, the step which comprises bringing together hydrogen fluoride, chlorine, a compound of the formula $C_2(Hal)_n$ wherein Hal represents halogen atoms of which at least three are chlorine atoms and $n$ represents 4 or 6, and a catalyst consisting of a mixture of antimony halides containing fluorine and chlorine, in which the antimony is present in both trivalent and pentavalent state and the fluorine content of the catalyst is within the range of 6 to 21%, and effecting reaction with the catalyst in liquid phase at a temperature above about 95° C.

26. In a process of preparing halogenated ethane derivatives containing fluorine, the step which comprises bringing together hydrogen fluoride, chlorine, perchloro-ethylene, and a catalyst consisting of a mixture of tri- and pentavalent antimony halides containing both fluorine and chlorine, in which the amount of fluorine is within a range of 6 to 21% and the amount of pentavalent antimony halide is within the range of about 70 to about 90% by weight of the catalyst, and effecting the reaction with the catalyst in liquid phase at a temperature within the range of about 150° to about 175° C.

27. In a process of producing halogenated ethanes containing fluorine, the steps which comprise passing hydrogen fluoride, chlorine and a chloro-ethylene into a series of antimony chloride catalysts containing a composition represented empirically by $$SbF_xCl_{5-x}$$

in which $x$ represents a positive value less than 3, maintaining the fluorine content of each successive catalyst lower than that of the preceding catalyst, while effecting reaction at temperatures above about 125° C. under a pressure sufficient to preserve the catalyst in liquid phase, and removing the vaporized fluorinated ethanes from the reaction zone.

28. A process for the production of tetrafluorodichloro-ethane which comprises passing hydrogen fluoride, chlorine and perchloro-ethylene into an antimony halide catalyst containing a composition represented empirically by $$SbF_xCl_{5-x}$$

in which $x$ represents a positive value less than 3, and maintaining the reaction zone at a temperature within the range of about 125° C. to about 175° C. under a super-atmospheric pressure of about 40 to about 200 pounds per square inch.

29. A process for the production of tetrafluorodichloro-ethane which comprises passing hydrogen fluoride into a reaction zone containing antimony pentachloride, subsequently introducing into the reaction zone perchloro-ethylene, and maintaining the reaction temperature above about 125° C. under super-atmospheric pressure.

HERBERT WILKENS DAUDT.
MORTIMER ALEXANDER YOUKER.

CERTIFICATE OF CORRECTION.

Patent No. 2,005,708. June 18, 1935.

HERBERT WILKENS DAUDT, ET AL.

It is hereby certified that error appears in the printed specification of the above numbered patent requiring correction as follows: Page 6, second column, line 46, for "without" read with; and page 8, first column, line 72, strike out the words "In general, the antimony catalysts which we have" and insert instead the words and syllable advantage because it reduces the vapor pres-; and that the said Letters Patent should be read with these corrections therein that the same may conform to the record of the case in the Patent Office.

Signed and sealed this 23rd day of July, A. D. 1935.

Leslie Frazer (Seal)

Acting Commissioner of Patents.